Sept. 30, 1958      A. G. BODINE, JR      2,853,852
BOUNDARY LAYER CONTROL FOR AERODYNAMIC DUCTS
Filed Dec. 10, 1956
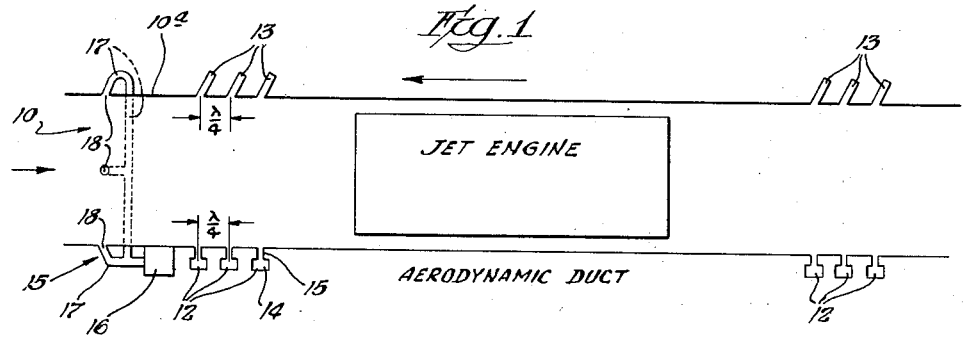
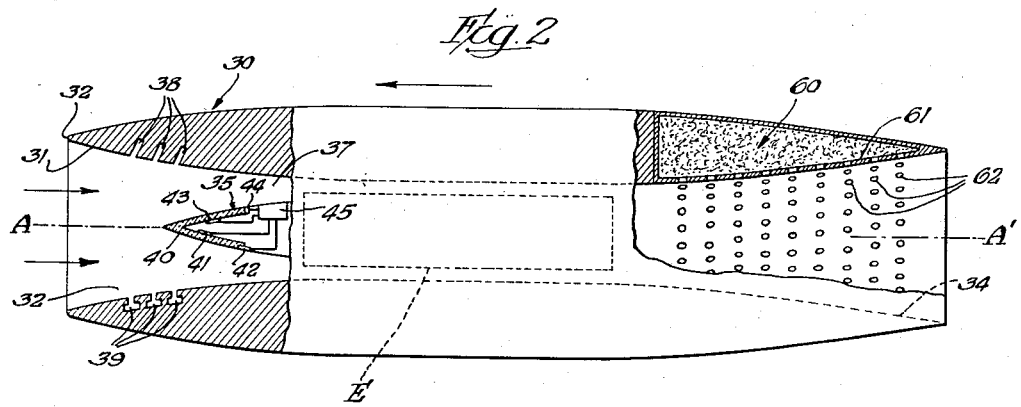
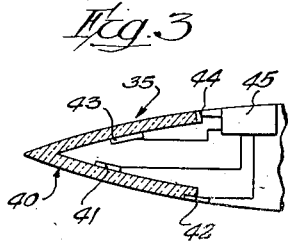
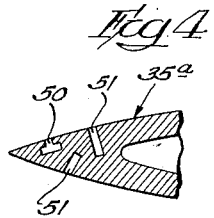
INVENTOR.
ALBERT G. BODINE, JR.
BY
ATTORNEY.

United States Patent Office 2,853,852
Patented Sept. 30, 1958

2,853,852
BOUNDARY LAYER CONTROL FOR AERODYNAMIC DUCTS

Albert G. Bodine, Jr., Van Nuys, Calif.

Application December 10, 1956, Serial No. 627,458

4 Claims. (Cl. 60—35.6)

This invention relates generally to the control of deleterious fluid boundary layer conditions adjacent the surfaces of aerodynamic ducts in various classes of jet engines, such as turbojets, ram jets, and the like. This application is a continuation-in-part of my copending application entitled Boundary Layer Control for Aerodynamic Bodies, filed July 28, 1951, Ser. No. 239,168, allowed July 31, 1956, now Patent No. 2,783,008.

The flow of gases along the surface of bodies at relatively high velocity, both subsonic and supersonic, such as along the interior surfaces of aerodynamic ducts in jet engines, generates undesirable acoustic phenomena causing increased air drag, vibration and noise, and, in accordance with the present invention, these effects are subjected to acoustic control and attenuation. Aerodynamic sound or noise is the manifestation of acoustical vibrations. Many aerodynamic investigators have noted vibrational effects, particularly in connection with the shedding of vortices (Kármán vortex trail). Also, high frequency velocity fluctuations have been detected in the boundary layer region where so-called laminar flow has broken into turbulent flow above the critical value for Reynolds' number. Still further, it can be shown that even air which is in supposedly steady flow, is actually undergoing vibration. Apparently, however, the acoustic nature of these aerodynamic vibrational effects, and the fact that aerodynamic sound directly evidences acoustic vibration which may affect the aircraft structure, has received little, if any, attention.

The object of the present invention is accordingly the control and attenuation of these acoustic phenomena as found in aerodynamic ducts, to the ends of reduction of air drag, vibration, both in the air and in the structure in which the duct is formed, and noise.

The present invention controls and attenuates these acoustic conditions by interfering with them acoustically, employing acoustic dissipative or attenuative means and methods. Boundary layer conditions adjacent aerodynamic duct surfaces involve acoustic phenomena including sound wave components of frequencies determined by the aerodynamic characteristics of the duct, manifesting themselves generally as shock wave phenomena, and these conditions, which cause both vibration and accompanying noise, can be dissipated by employing acoustic means capable of interfering with such phenomena. In this connection, standing waves, shock waves and shock front are equivalent terms denoting the same or intimately connected aerodynamic-acoustic vibration phenomena, and the invention provides for attenuative control, i. e., dissipation of such undesired acoustic performance either by radiating additional controlled sound waves into or along the boundary layer adjacent the duct surface, breaking up it by interfering with its equilibrium state, or by employment of other kinds of acoustic attenuators, such as, for example, the absorber type. The shock wave, such as that existing at the leading edge of a supersonic air foil shape forming a defining part of the duct, and which also includes components of frequencies determined by the aerodynamic characteristics of the duct, is also subject to control or attenuation by the present invention. Thus a sound wave injected into the piled up layer of compressed air at the nose or leading edge of a supersonic air foil shape incorporated in the duct tends to interfere with the equilibrium state of such layer and thereby dissipates it, with the effect of reducing the thickness and/or lateral extension of the "shock front," and hence of reducing the energy dissipation owing to turbulence caused by the shock wave.

The invention will be better understood by referring now to the following detailed description, reference being had to the accompanying drawings, in which:

Fig. 1 is a diagrammatic view of an aerodynamic duct containing a jet engine;

Fig. 2 is a partially diagrammatic and partially structural side elevational view, with portions broken away to reveal underlying members in sections, of an aerodynamic body with an aerodynamic duct for a jet engine;

Fig. 3 is an enlarged detail of a portion of Fig. 2; and

Fig. 4 is a modification of Fig. 3.

Fig. 1 is a purely diagrammatic view of a common, representative aerodynamic duct 10 such as is often used within an aerodynamic body, fuselage, wing, or the like, and which may contain any jet engine, represented at 11, utilizing the airflow through the duct. The jet engine may be of various types, e. g., turbojet, ram jet, or the like, and the duct itself may be of any suitable design for the type of engine used, and may be designed for subsonic or supersonic airflow velocity, all in accordance with knowledge now common in the art. Suitable designs being well known, and the particular design of the engine and duct not being a part of the instant inventions, a structural illustration of these components is, for simplicity, omitted in Fig. 1.

It is to be understood that such a duct as referred to suffers from extreme proneness to acoustic noise and vibrations, which proneness I have ascertained to be connected with boundary layer and/or shock wave phenomena.

For the dissipation of these well known but highly deleterious conditions, the duct is equipped, in accordance with the invention, with sound wave dissipative or attenuative means, and in further accordance with the invention, these may be of two main types, viz., acoustic absorbers, and sound wave radiators.

The wall 10a of the duct 10 is accordingly shown to be furnished with a plurality of spaced acoustic absorbers, some ahead of and some aft of the jet engine. Fig. 1 thus shows a plurality of Helmholtz resonant absorbers 12, and a plurality of quarter wave length resonant absorbers 13 in the form of short pipes.

The Helmholtz resonators comprise cavities 14 outside the duct wall, and short necks 15 extending through the duct wall and opening therethrough to the duct, as indicated. These are made of such dimensions as to have an attenuative response at the frequencies of such acoustic air vibrations as are encountered within the duct. Such frequencies, for any design of duct, may be ascertained by suitable pickups or probes, and the resonators designed accordingly, as will be readily understood by those skilled in the art. There may be a number of different acoustic wave frequencies to be combatted, and the Helmholtz resonators may obviously be of different dimensions to respond to all of these, or at least those found most troublesome.

The quarter wavelength pipe absorbers 13 comprise closed ended pipes of quarter wavelength for the wave frequencies to be combatted, arranged outside the wall of the duct, and opening inside thereof, as shown.

A feature of the invention, applicable in those cases in which resonant standing wave patterns are known or believed to exist along the surfaces of the duct wall, is the spacing of a plurality of these absorbers by a quarter wavelength, $$\frac{\lambda}{4}$$

of a particular acoustic wave to be absorbed, in a direction longitudinally of the wave pattern, such as illustrated in Fig. 1. In this connection, as is well known to those skilled in the acoustics art, a resonant absorber is most effective at a high impedance region of the wave to be combatted. It must be appreciated that a sound wave often appears in a resonant standing wave pattern, with pressure antinode regions, where gas vibration amplitude is minimized but wave pressure amplitude is maximized, and velocity antinode regions where these performances are interchanged. The pressure antinode regions are known acoustically as regions of high impedance; and the wave can be best absorbed and attenuated by a resonant absorber located at these high impedance or pressure antinode regions. The velocity antinode regions are found to be spaced a quarter wavelength distance from the high impedance pressure antinode regions. Accordingly, by using a plurality of absorbers at $$\frac{\lambda}{4}$$

spacing, it is found that if one absorber is spaced relatively distant from a high impedance region of the acoustic wave pattern, the next adjacent absorber will be correspondingly near a high impedance region. The combined effect of the pair is then the equivalent of one absorber located precisely at a pressure antinode.

Fig. 1 shows also an attenuator 15 of the sound wave radiation type. Illustratively, a siren type of sound wave generator 16 is connected by piping 17 to jets 18 opening inside the duct. The sound generated at 16 is then radiated into the boundary region of the duct, i. e., adjacent the duct walls, where a layer of compressed air tends to accumulate at sonic or supersonic air velocities. This radiation of sound into the piled up boundary layer of compressed air disperses the air layer and the shock wave.

Fig. 2 is a somewhat diagrammatic illustration of the aerodynamic body containing an aerodynamic duct for a jet engine, equipped with sound attenuation means in accordance with the invention. A ducted body 30, of typical supersonic air foil section as seen in a longitudinal section taken through one side wall thereof, is in a form which may be regarded as generated by revolving the said air foil section about a longitudinal axis A—A. This body 30 has streamlined duct 31, and, as seen in longitudinal section, is relatively sharp or thin where its exterior and interior wall surfaces converge at the nose, as indicated at 32. In some forms the external surface is straight, or nearly so. The duct 31 has a convergent region 32 leading to a central region, in which the jet engine E is understood to be located, and is divergent in the tail region, as indicated at 34. A typical diffusor or fairing cone, centrally located within the duct, is partially shown at 35, and will be understood to cooperate with the duct wall to define an annular streamlined passage 37 leading to the jet engine, which again may be of any type, and hence is only diagrammatically represented.

Quarter wave spaced absorbers, including quarter wave absorbers 38 and Helmholtz absorbers 39 are shown within the nose portion of body 30, opening to convergent region 32 of duct 31. These need not be further described, as they are similar in all essential respects, in nature, spacing, and function, to those described in connection with Fig. 1.

In addition, the diffusor cone 35 is equipped with shock front or wave attenuation means of the sound wave radiation type (see also Fig. 3). In this case, the forward portion of the cone 35 is itself made to be a sound wave radiator, by composing it of a properly shaped member 40 composed of an electrostrictive material, such as barium titanate, which is a dielectric ceramic (like a piezoelectric crystal), which is subject to cyclic electrostriction when subjected to a cyclic electrostatic field. As here shown, two separate pairs of electrodes, 41, 42 and 43, 44 are energized through suitable electric circuits from an oscillator 45. The dielectric material in between the electrodes of each pair is subject to electrostriction in response to the frequency and power of output from the oscillator, setting the leading or nose portion 40 of the cone into corresponding vibration. The member 40 thus becomes a radiator of sound, of frequency governed by the frequency of the oscillator, and projects its radiated sound into the leading edge boundary region of the cone, as well as the interior duct surfaces of the body 30, where compressed air boundary layer conditions tend to develop at sonic speed. As already set forth, this radiation of sound into the piled up boundary layer conditions as described disperses the compressed air layer and attenuates or reduces the shock front.

Fig. 4 shows how a diffusor cone 35a may alternatively be equipped with shock front attenuator means of the resonant absorber type. Thus, as shown, the forward portion of the cone is equipped with a Helmholtz resonator 50, and two quarter wavelength holes 51 (quarter wavelength for two different frequencies), formed in the cone adjacent its point. The shock wave contains high frequency sound wave components, and can be suppressed by absorbing these components by use of resonant absorbers as shown designed to be resonant for the offensive frequencies.

Referring again to Fig. 2, the tail region of body 30 is shown to be equipped with an alternative type of sonic attenuator, designated generally at 60. The tail region of the duct is shown to be defined by a wall section 61 formed with perforations 62, and in back of which is a pocket filled with a body 64 of sound wave absorptive material, such as stainless steel. Such an absorber is effective at the location of pressure antinode regions of a sound wave in the boundary layer adjacent the wall to damp the sound wave.

Various illustrative forms of the invention have now been indicated, but it is to be understood that these are examples only, and that various alternative and additional embodiments of the invention will occur to those skilled in the art without departing from the spirit and scope of the appended claims.

I claim:

1. Means for controlling aerodynamic-acoustic vibration originating in a layer of air adjacent the surface of a defining wall of an aerodynamic jet engine duct, through which air travels at velocities of sonic order and wherein said aerodynamic-acoustic vibration includes acoustic components of frequencies determined by the aerodynamic characteristics of said duct, comprising, in combination with said duct, sound wave attenuator means mounted outside said duct and having a portion thereof extending through said wall to said wall surface and communicating with said layer of air in the region of the aerodynamic-acoustic vibration for attenuating said frequencies at said region.

2. The subject matter of claim 1, wherein said attenuator means includes two resonant absorbers spaced from one another along said surface approximately one quarter wavelength distance corresponding to the wave to be attenuated.

3. The subject matter of claim 1 wherein said attenuator means is a sound wave absorber.

4. The subject matter of claim 1, wherein said attenuator means is a sound wave generator.

No references cited.